United States Patent [19]

Sakai et al.

[11] Patent Number: 4,794,425
[45] Date of Patent: Dec. 27, 1988

[54] OVERHEAD PROJECTOR WITH A COPYING DEVICE

[75] Inventors: Jun Sakai, Nagoya; Kenji Sakakibara; Masanari Kobayashi, both of Ichinomiya, all of Japan

[73] Assignee: Brother Kogyo Kabushiki Kaisha, Nagoya, Japan

[21] Appl. No.: 50,456

[22] Filed: May 18, 1987

[30] Foreign Application Priority Data

May 19, 1986 [JP] Japan ................................ 61-113875

[51] Int. Cl.⁴ ............................................. E03B 27/52
[52] U.S. Cl. ...................................... 355/27; 355/43; 355/45
[58] Field of Search ...................... 355/43, 44, 45, 27; 250/317–319

[56] References Cited

U.S. PATENT DOCUMENTS

| | | | |
|---|---|---|---|
| 4,082,446 | 4/1978 | Driscoll et al. | 355/45 X |
| 4,260,246 | 4/1981 | Rollenitz | 355/45 |
| 4,399,209 | 11/1981 | Sanders et al. | 430/138 |
| 4,440,846 | 11/1981 | Sanders et al. | 430/138 |
| 4,501,809 | 7/1982 | Hiraishi | 430/138 |

FOREIGN PATENT DOCUMENTS

| | | | |
|---|---|---|---|
| 58-88739 | 5/1983 | Japan . | |
| 58-88740 | 5/1983 | Japan . | |
| 61-29877 | 2/1986 | Japan | 355/45 |
| 61-134778 | 6/1986 | Japan | 355/45 |

Primary Examiner—L. T. Hix
Assistant Examiner—D. Rutledge
Attorney, Agent, or Firm—Jones, Tullar & Cooper

[57] ABSTRACT

An overhead projector in which a light from a light source is transmitted through an original, and a resulting original image is projected on a screen by means of a projection optical system including a projection lens and a half-mirror. At the same time, the original image is transmitted through the half-mirror, and delivered to a record medium by means of an exposure optical system. The exposure optical system includes a shutter member which can be shifted between a shielding mode and a copying mode. In the shielding mode, the optical path of the exposure optical system is closed to permit projection on the screen. In the copying mode, the optical path is opened so that the original image, to which the record medium is exposed, is visualized on the record medium by a developing process. At the end of the copying mode, the record medium is discharged into a tray.

12 Claims, 2 Drawing Sheets

OVERHEAD PROJECTOR WITH A COPYING DEVICE

BACKGROUND OF THE INVENTION

The present invention relates to an overhead projector with a copying device, capable of monochromatic or color copying.

These days, overhead projectors are used indispensably in conferences, research study, various presentations, etc. They are useful means for visually giving precise information or data, carried by original papers, to participants or attendants, using a screen for projection. However, the conventional overhead projectors do not have a copying function.

In presentations and the like, using the overhead projectors, the contents of the original have often been expected to be distributed or handed, in the form of copies, to the individual attendants, besides being projected on the screen. Such copies would be required especially when the contents of the original should be amended or supplemented. In such a case, the copies conventionally must be made by means of a separate copying machine, thus delaying the presentations considerably.

SUMMARY OF THE INVENTION

The present invention has been developed in consideration of these circumstances, and is intended to provide an overhead projector which can produce clear copies of an original for overhead projectors, on the spot, without requiring use of a separate copying machine.

In order to achieve the above object, according to the present invention, a copying section is provided in addition to a projector section of a projector for projecting an image of an original on a screen. The copying section includes an exposure optical system, which delivers the original image, received from a projection optical system of the projector section, to a record medium, thereby exposing the medium to the image.

With use of the projector constructed in this manner, a clear image of the original can be obtained easily on the spot, without removing the original from the projector. In the case of a prior art projector, having no copying function, the original must be set in the projector again, after it is removed therefrom to be copied by means of a separate copying machine. Thus, the conventional projector requires troublesome operations, which inevitably suspend projection, thereby delaying the presentations and lowering the operating efficiency of the projector. The present invention can settle these problems.

According to a preferred arrangement of the invention, the original image is transported from the projection optical system by means of a half-mirror. Thus, the two optical systems can be connected easily with high optical accuracy.

According to another preferred arrangement, the exposure optical system includes a shutter member, which can be shifted alternatively between a shielding mode, in which the optical path of the exposure optical system is closed by the shutter member, and a copying mode in which the optical path is open. When using the projector as a regular one, the shutter member is set to the shielding mode, so that the record medium is prevented from being exposed. In starting a copying operation, the shutter member is shifted to the copying mode by turning on a manual copy switch on the projector, for example. In the copying mode, the record medium is allowed to be exposed to the original image.

According to still another preferred arrangement, the record medium used is a color light- and pressure-sensitive sheet, which is composed of a substrate, a layer of microcapsules reactive individually to radiations of different wavelengths, and a layer of developer material adapted to develop color when the microcapsules are ruptured, the two layers being put successively on the substrate.

Thus, the overhead projector according to the present invention can produce color copies of the original image, and can enjoy a compact design, as a whole, without entailing a high manufacturing cost.

DETAILED DESCRIPTION OF THE PREFERRED EMBODIMENTS

Figure 1:
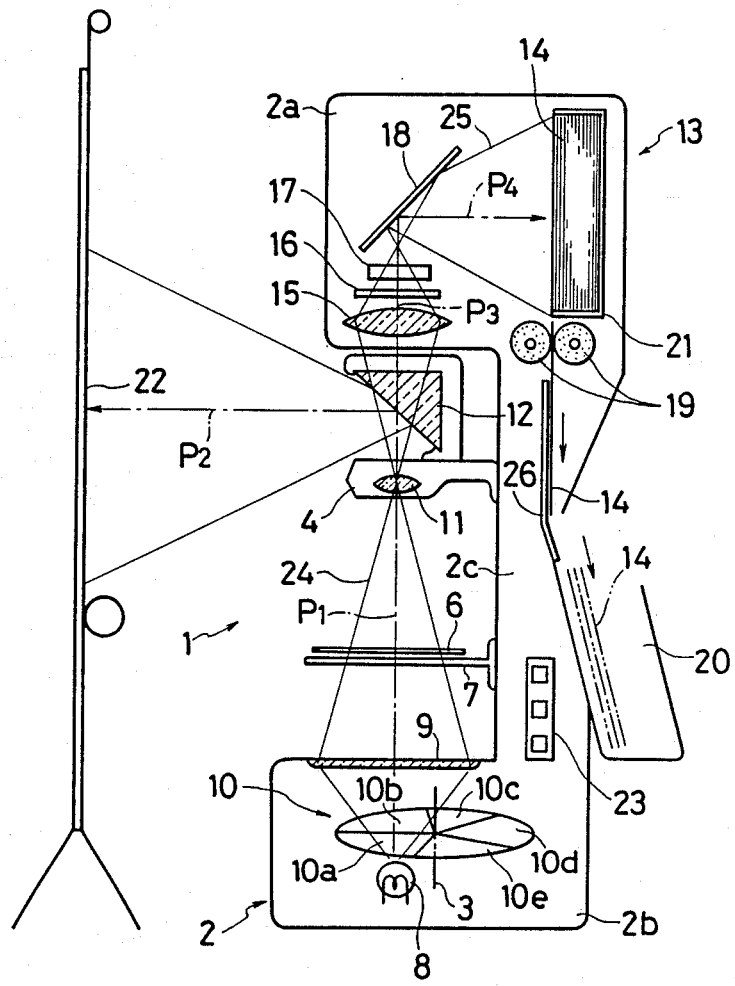
FIG. 1 is a schematic view of an overhead projector with a copying device according to an embodiment of the present invention.

As shown in FIG. 1, an overhead projector 1 has a vertical frame 2, which is composed of upper and lower portions 2a and 2b and a middle portion 2c connecting them. The middle portion 2c is fitted with a stage holder 7, which serves as support means capable of carrying thereon an original 6 for overhead projector. Under the stage holder 7, a projection/exposure lamp 8, for use as a light source, is located inside the lower portion 2b. Between the holder 7 and the lamp 8, moreover, a Fresnel lens 9, as a condenser, and a disk-shaped filter 10 are arranged also inside the lower portion 2b. The filter 10, which is rotatable around a vertial axis 3, comprises a projection filter portion or sector 10a, filter portions or sectors 10b, 10c and 10d corresponding to red, green, and blue, as basic colors, and a filter portion or sector 10e for monochromatic exposure.

A projection lens 11 and a half-mirror 12 are arranged succesiively over the stage holder 7. They are supported by a support frame 4 in front of the middle portion 2c of the frame 2, that is, on that side of portion 2c facing a screen 22.

The lens 11 and half-mirror 12, along with the Fresnel lens 9 and the filter 10, constitute a projection optical system 24. A light emitted from the light-source lamp 8 is transmitted through the filter 10 and the lens 9, along a vertical optical path P1, to be applied to the original 6, which is formed of a light-permeable sheet. Thereupon, an original image is formed, and it is transmitted through the projection lens 11 and then reflected by the overlying half-mirror 12. Thereafter, the image is delivered to the screen 22 along an optical path P2 which extends substantially at right angles to the optical path P1. Thus, the image is projected on the screen 22 with a predetermined magnification.

The above described arrangement, which serves to accomplish the projecting operation, constitutes a projector section of the projector. At least those regions of the holder 7 and the support frame 4 which are intended to permit the passage of the light, are formed of light-permeable material.

A copying device 13 is located at the upper portion 2a of the overhead projector 1. The device 13 constitutes a copying section which is used to copy the original 6 placed on the stage holder 7. A color light- and pressure-sensitive sheet 14 of a positive type is used as a record medium for the copying device 13.

In copying the original image to the light- and pressure-sensitive sheet 14, the image is transferred along optical paths P3 and P4 and exposed by means of an exposure optical system 25, which will be described in detail later.

The half-mirror 12 has a function to transmit the original image from the optical path P1 to the path P3, as well as the function to reflect the image onto the screen 22.

Referring now to FIGS. 2 to 5, the structure of the color light- and pressure-sensitive sheet 14, for use as the record medium, will be described in brief.

Figure 2:
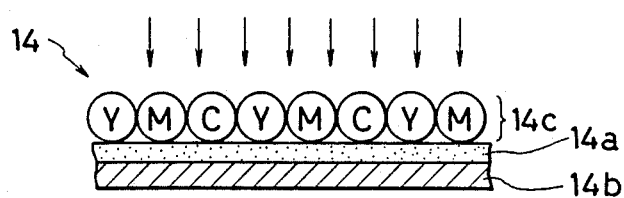
FIG. 2 is a schematic cross-sectional view showing the construction of a color light- and pressure-sensitive sheet used in the overhead projector of FIG. 1.

As shown in FIG. 2, the light- and pressure-sensitive sheet 14 has a three-layer construction, including a substrate 14b, a coating layer 14a of developer material thereon, and a layer 14c of microcapsules. The microcapsule layer 14c includes microcapsules of three types, i.e., microcapsules C, M and Y which harden when exposed to ultraviolet radiations of wavelengths $\lambda C$, $\lambda M$ and $\lambda Y$ of, e.g., about 340 nm, 385 nm, and 470 nm, respectively. When the light from the original image is applied to the sheet 14, as indicated by arrows in FIG. 2, the individual microcapsules C, M and Y of the microcapsule layer 14c react selectively to the light.

Figure 3:
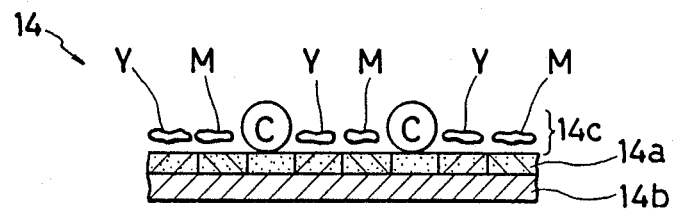
FIGS. 3, 4 and 5 are schematic views showing processes of exposure and development of the color light- and pressure-sensitive sheet of FIG. 2.

More specifically, an achromatic dye contained in the microcapsules C reacts to the developer layer 14a, thereby developing a color of cyan. Also,(achromatic dyes contained in the microcapsules M and Y develop colors of magenta and yellow, respectively. Thus, if the light- and pressure-sensitive sheet 14 is exposed to the radiation of the wavelength $\lambda C$, only the microcapsules C harden. In a developing process, therefore, the microcapsules M and Y are ruptured, thereby developing colors of magenta and yellow, as shown in FIG. 3. As a result, a red color appears on the sheet 14.

A pair of developing rollers 19, which are used in the developing process, are located under and close to a cassette 21 in which the light- and pressure-sensitive sheets 14 are stored in layers. As the outermost sheet 14 is delivered downward from the cassette 21, after exposure, the developing rollers 19 receive the sheet 14 and apply a pressure to it. As a result, those microcapsules remaining unhardened in the microcapsule layer 14c are ruptured and react to the developer layer 14a.

After the developing process, the sheet 14 is fed further downward along a guide 26, as indicated by an arrow in FIG. 1, and is then discharged into a tray 20. The tray 20 is situated on the rear side of the middle portion 2c of the frame 2, opposite to the front side thereof facing the screen 22. Thus, the tray 20 does not interfere with the projection optical system 24 of the projector 1, and enables a user or operator, who is expected to stand behind the projector 1, to take out the copied sheet 14 smoothly.

Figure 4:
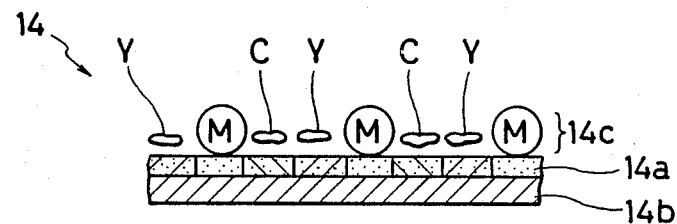

If the light- and pressure-sensitive sheet 14 is exposed to the radiation of the wavelength $\lambda M$, only the microcapsules M harden. In the developing process, therefore, the microcapsules C and Y are ruptured, thereby developing colors of cyan and yellow, as shown in FIG. 4. As a result, a green color appears on the sheet 14.

Figure 5:
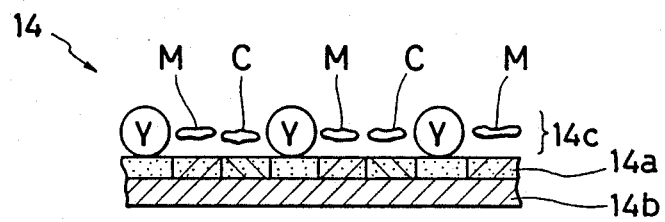

Likewise, if the sheet 14 is exposed to the radiation of the wavelength $\lambda Y$, only the microcapsules Y harden. In the developing process, therefore, the microcapsules C and M are ruptured, thereby developing colors of cyan and magenta, as shown in FIG. 5. As a result, a blue color appears on the sheet 14.

Since the structure of the sheet 14 itself is generally known (refer to U.S. Pat. No. 4,440,846), a further detailed description thereof is omitted herein.

Arranged over the half-mirror 12 are an exposure lens 15, a shutter member 6, a wavelength changing element 17, and a mirror 18, which constitute the exposure optical system 25. The light from the projection-/exposure lamp 8 is projected onto the sheet 14 along the optical path P3, which extends vertically in line with the optical path P1, and the path P4, which extends substantially at right angles to the path P3 and is directed toward the sheet 14.

The wavelength changing element 17 serves to change red, green, and blue lights into lights of the wavelengths $\lambda C$, $\lambda M$ and $\lambda Y$, respectively. Thus, the element 17 is used to make the three basic colors, red, green, and blue, of the original image correspond to the different microcapsules C, M and Y, respectively, of the microcapsule layer 14c on the sheet 14.

If the overhead projector, constructed in this manner, is utilized as a regular prjector, the projection filter portion 10a, among other filter portions of the filter 10, is used to transmit visible radiations only. The filter 10 is rotated around the axis 3 so that the filter portion 10a is situated in the optical path P1. In this state, the light from the projection/exposure lamp 8 is transmitted through the original 6 on the stage holder 7 and the projection lens 11, and is then reflected by the half-mirror 12 to be projected on the screen 22.

During the aforesaid regular use of the projector, the shutter member 16 of the exposure optical system 25 is in a shielding mode, so that the light- and pressure-sensitive sheet 14 cannot be exposed. Namely, in the shielding mode, the shutter member 16 is situated in such a position that it closes the optical paths P3 and P4 of the optical system 25.

In starting to copy the contents of the original 6, a copy switch 23, for use as a manual switch member, mounted on the middle portion 2c of the frame 2 for the ease of external operation, must only be turned on, with the original 6 kept on the holder 7. Thereupon, the shutter member 16 is switched to a copying mode in which the optical paths P3 and P4 are open. In this state, the original image is allowed to be transmitted through the half-mirror 12 and the exposure optical system 25, to the light- and pressure-sensitive sheet 14.

According to this embodiment, the copying device can perform color copying. In this case, if the copy switch 23 is turned on, the color light- and pressure-sensitive sheet 14 is exposed three times for the microcapsules of yellow, magenta, and cyan, as the filter portions 10b, 10c 10d of the filter 10 are shifted successively. When the filter portion 10b is first opposed to the projection/exposure lamp 8, a red light, transmitted through the filter portion 10b, passes through red-image regions of the original 6. Then, after passing through the projection lens 11, half-mirror 12, exposure lens 15, and shutter member 16, the light reaches the wavelength changing element 17. Thereupon, the red light is changed into a light having thewwavelength $\lambda C$, and is projected onto the sheet 14. As a result, the microcapsules C are hardened.

Likewise, the filter portions 10c and 10d of the filter 10 are opposed in succession to the projection/exposure lamp 8, so that the microcapsules M and Y on the color light- and pressure-sensitive sheet 14 are hardened successively in accordance with the image on the original 6. After the three cycles of exposure end, the sheet 14 is developed by means of the developing rollers 19, and then discharged into the tray 20. In this manner, a color copy of the original 6 can be obtained with ease. Thus, the projector of the present invention can be used not only for projection on the screen 22, but also for quick distribution of copies, for example, to attendants of presentations using the projector, at any time. Thus, the effects of the presentations can be improved.

The operation of the shutter member 16 is associated with the rotation of the filter 10 so that the member 16 is shifted instantaneously from the copying mode to the shielding mode before the shift of the rotating filter 10 is finished, and that the member 16 is shifted automatically to the copying mode on completion of the shift of the filter 10. Accordingly, the lamp 8 need not be turned off with every rotation of the filter 10 for shifting.

Although an illustrative embodiment has been described herein in connection with the case of color copying, the present invention may also be applied to monochromatic copying. In this case, monochromatic light- and pressure-sensitive sheets are used which are less expensive than the color copying sheets. Each monochromatic sheet is exposed through the filter portion 10e for monochromatic exposure, by turning on and off the shutter 16 once. Thereafter, the sheet is developed by means of the developing rollers 19, and then discharged into the tray 20, just as in the case of the color copying.

In the embodiment described above, the color light- and pressure-sensitive sheet 14 is used with the copying device. Alternatively, however, xerography or other copying methods may be utilized. With use of the color copying sheet 14, however, the copying device can be simplified in construction, and can therefore be made more compact and low-priced.

In the above embodiment, moreover, the light source used is designed to emit ultraviolet radiations. Alternatively, however, visible radiations may be used so that a photosensitive paper sheet, for use as the record medium, is exposed to them.

According to the above embodiment, furthermore, the color light- and pressure-sensitive sheet, as the record medium, has a self-developing structure, as disclosed in U.S. Pat. No. 4,440,846. Alternatively, a copying pad of the so-called transfer type may be used, which is composed of a sheet coated with developer material and a sheet bearing a layer of microcapsules thereon, as stated in U.S. Pat. No. 4,399,209, for example. In this copying pad, color is transferred from the microcapsule-covered sheet to the developercoated sheet.

Although a wavelength changing element is used in the foregoing embodiment, some record media may be used without requiring such an element.

Thus, the present invention is not limited to the embodiment described above, and various changes and modifications may be effected therein by one skilled in the art without departing from the scope or spirit of the invention.

What is claimed is:

1. An overhead projector, comprising:

a projector section including support means supporting an original, a light source, and projection optical system means for applying a light from the light source to the original and projecting a light of an original image onto a screen;

a copying section including a record medium capable of recording the original image thereon by exposure to the light of the image, exposure optical system means connected to the projection optical system means of the projector section, said exposure optical system means receiving the light of the image from the projection optical system means and transmitting the light of the image to the record medium thereby recording the image on the record medium, and developing means for applying a pressure to the record medium, with the image recorded thereby visualizing the recorded image on the record medium; and said record medium being formed of a light-and pressure-sensitive sheet means including substrate means, a sheet element of pressure-rupturable microcapsules which contain achromatic dyes and are liable to change their hardness when exposed to the light of the image, and a sheet element of developer material reacting to the achromatic dyes of the microcapsules to develop color when the microcapsules are ruptured by the pressure of said devloping means.

2. The overhead projector according to claim 1, wherein said pressure-rupturable microcapsules include first, second and third types of microcapsules which are adapted to harden when exposed to light of first, second and third different wavelengths corresponding to said first, second and third types of microcapsules respectively, said first, second and third types of microcapsules containing first, second and third achromatic to develop colors of cyan, magenta and yellow respectively upon reaction to the developer material.

3. The overhead projector according to claim 1, wherein said light- and pressure-sensitive sheet means is composed of a single sheet which has a first layer of said substrate, a second layer of said sheet element of pressure-rupture microcapsules, and a third layer of said sheet element of developer material.

4. The overhead projector according to claim 1, wherein said light-and pressure-sensitive sheet means is composed of two separate sheets and said substrate means has first and second substrates for the respective sheets, one of said sheets has a first layer of said substrate, and a second layer of said sheet element of pressure-rupturable microcapsules coated on said first layer, substrate, and a fourth layer of said sheet element of developer material.

5. The overhead projector according to claim 1, wherein said support means is positioned vertically and includes an upper portion, a lower portion, and a middle portion connecting the upper and lower portions, said middle portion having a front side facing the screen and a rear side opposite to the front side, said original is mounted in the front side of the middle portion, a cassette is disposed in the upper portion for holding a plurality of said record media in layers and delivering the record media successively downward, said developing roller means is disposed under the cassette, and a tray is disposed under the developing roller means and on the rear side of the middle portion, so that the record medium developed by the developing roller means is received by the tray without interferring with the projection optical system means.

6. The overhead projector according to claim 1, wherein said light- and pressure-sensitive sheet means reacts only to a light of a certain wavelength, and said exposure optical system means of said copying section includes a wavelength changing element for adjusting a light of a specific color from the original image, received from the projection optical system means, to said certain wavelength.

7. The overhead projector according to claim 1, wherein said light- and pressure-sensitive sheet means reacts to lights of a plurality of different wavelengths, and said exposure optical system of said copying section includes a wavelength changing element for individually adjusting lights of a plurality of different colors from the original image, received from the projection optical system means, to said plurality of wavelengths.

8. The overhead projector according to claim 7, wherein said projection optical system means of said projector section includes filter means disposed between the light source and the support means, said filter means having a plurality of filter portions arranged corresponding individually to said plurality of colors, said filter portions being shiftable so as to be located successively in the optical path of the projection optical system means.

9. The overhead projector according to claim 8, wherein said exposure optical system means of said copying section includes a shutter member alternatively shiftable between a copying mode, in which the optical path of the exposur optical system means is open and allows the original image to be transmitted to the light- and pressure-sensitive sheet means, and shielding mode in which the optical path is closed by the shutter member, the shift of said shutter member corresponding to the shift of the filter means.

10. The overhead projector according to claim 1, wherein said exposure optical system means of said copying section includes a shutter member alternatively shiftable between a copying mode, in which the optical path of the exposure optical system means is open and allows the original image to be transmitted to the record medium, and a shielding mode in which the optical path is closed by the shutter member.

11. The overhead projector according to claim 10, further comprising a switch member used to manually shift the shutter member at least to the copying mode.

12. The overhead projector according to claim 1, wherein said projection optical system means of said projector section includes a half-mirror reflecting the original image onto the screen and also transmitting the original image, and said exposure optical system means of said copying section receives the original image through the half-mirror.

* * * * *

UNITED STATES PATENT AND TRADEMARK OFFICE
CERTIFICATE OF CORRECTION

PATENT NO. : 4,794,425

DATED : December 27, 1988

INVENTOR(S) : Jun Sakai et al.

It is certified that error appears in the above-identified patent and that said Letters Patent is hereby corrected as shown below:

Claim 2, column 6, line 37, between "achromatic" and "to" insert --dye--.

Claim 3, column 6, line 44, change "rupture" to --rupturable--.

Claim 9, column 8, line 5, change "exposur" to --exposure--; and
line 7, between "and" and "shielding" insert --a--.

Signed and Sealed this

Eleventh Day of July, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,794,425

DATED : December 7, 1988

INVENTOR(S) : Jun Sakai et al

It is certified that error appears in the above-identified patent and that said Letters Patent is hereby corrected as shown below:

Claim 4, column 6, line 50, between "said" and "substrate" insert --first--; and line 53, before "substrate" insert --and the other sheet has a third layer of said second--.

Claim 5, column 6, line 61, between the "," and "a" insert --said light source is disposed in the lower portion, said projection optical system means is located in the front side of the middle portion,--.

Signed and Sealed this

Twenty-fifth Day of September, 1990

Attest:

HARRY F. MANBECK, JR.

*Attesting Officer*    *Commissioner of Patents and Trademarks*